Oct. 22, 1963
R. O. CHURCH
3,108,022
APPARATUS FOR COATING AN ELONGATE BODY WITH
FLUIDIZED COATING MATERIAL
Filed May 9, 1960
4 Sheets-Sheet 1
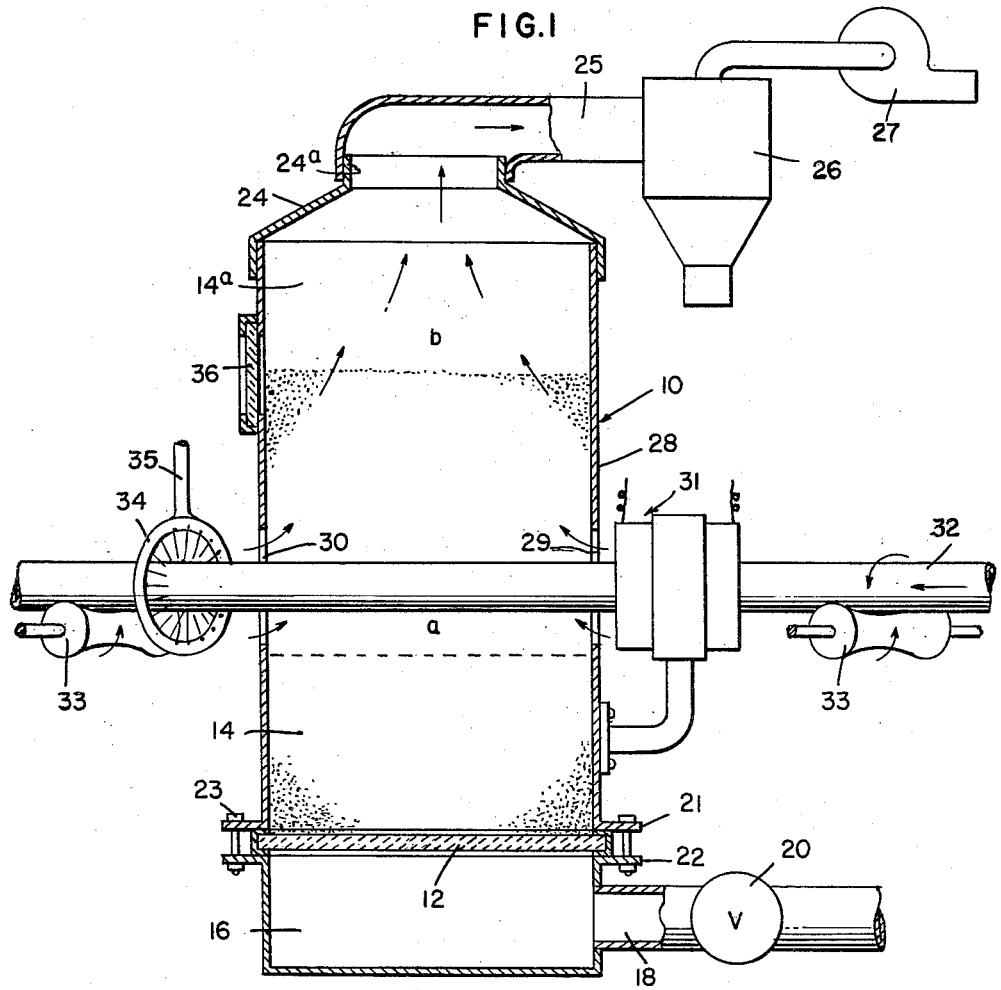
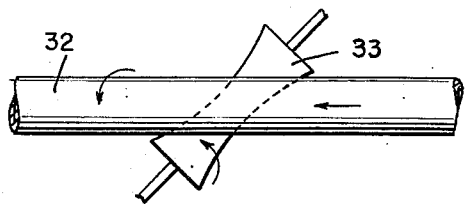
*INVENTOR*
Richard O. Church
BY *Richard O. Church*
*ATTORNEY*

INVENTOR
Richard O. Church

BY *Richard O. Church*
ATTORNEY

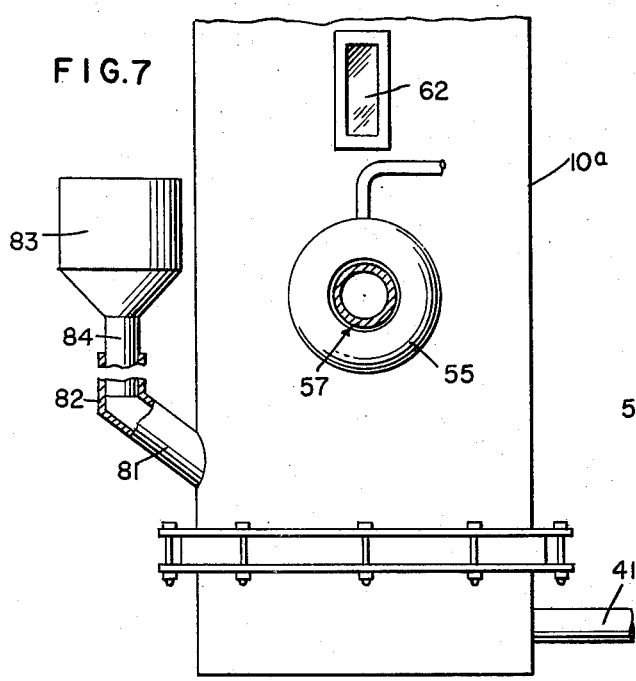
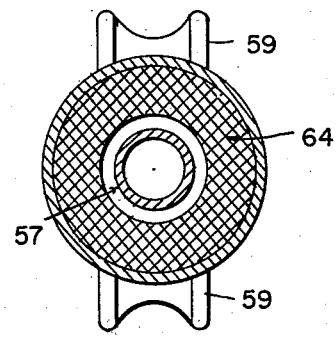
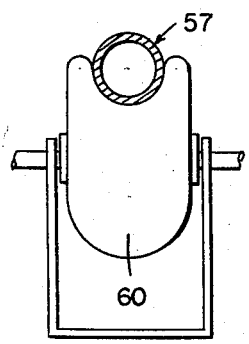
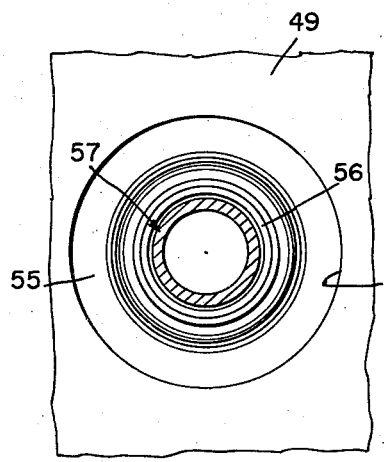
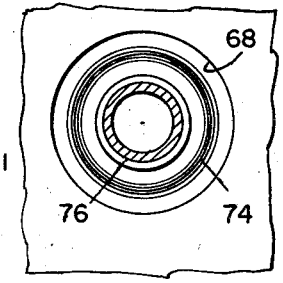

Oct. 22, 1963 R. O. CHURCH 3,108,022
APPARATUS FOR COATING AN ELONGATE BODY WITH
FLUIDIZED COATING MATERIAL
Filed May 9, 1960 4 Sheets-Sheet 4
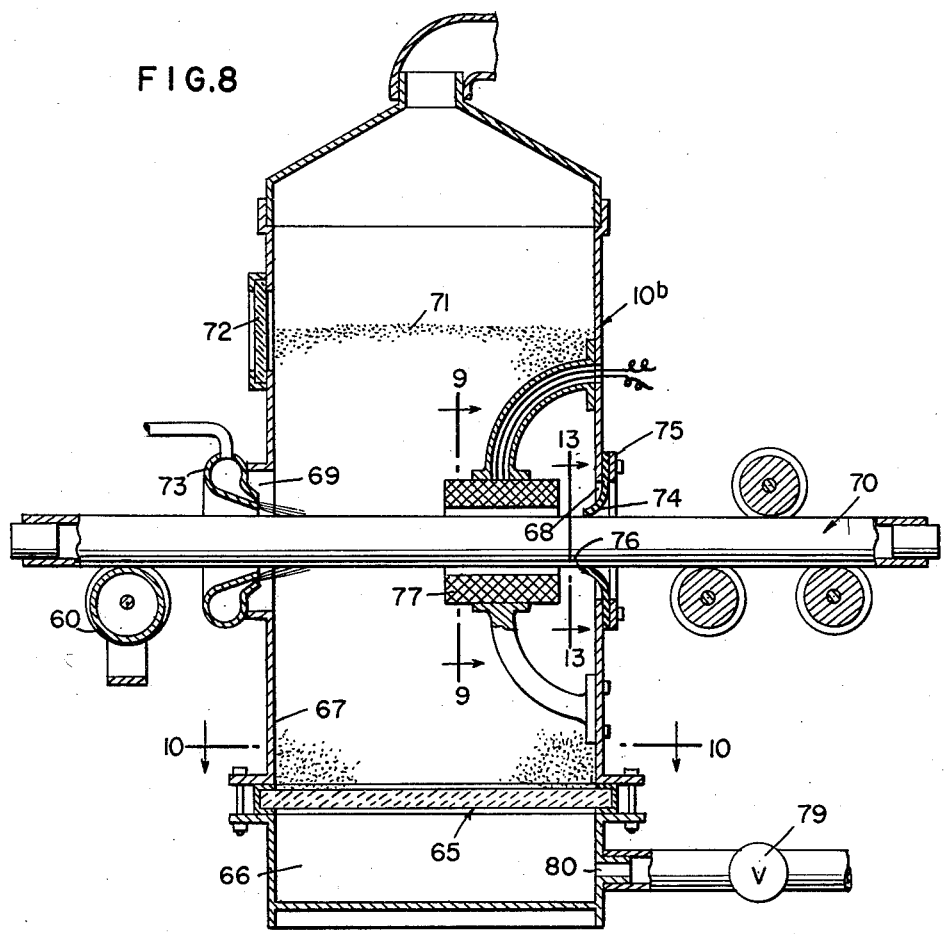
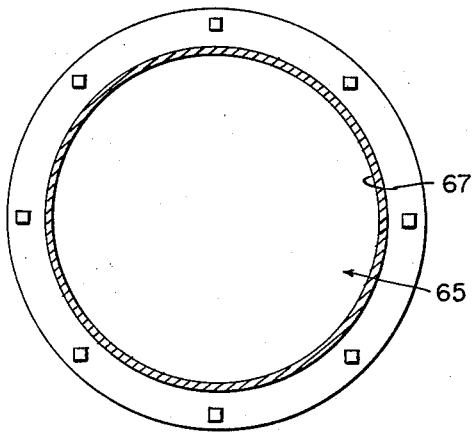
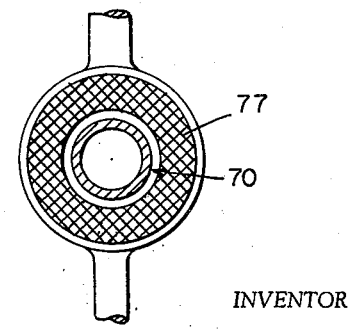
INVENTOR
Richard O. Church
BY *Richard O. Church*
ATTORNEY

United States Patent Office 3,108,022
Patented Oct. 22, 1963

3,108,022
APPARATUS FOR COATING AN ELONGATE BODY WITH FLUIDIZED COATING MATERIAL
Richard O. Church, Reading, Pa., assignor, by mesne assignments, to Polymer Processes, Inc., Reading, Pa., a corporation of Pennsylvania
Filed May 9, 1960, Ser. No. 27,894
9 Claims. (Cl. 118—58)

This invention relates generally to the class of coating and is directed particularly to an improved apparatus for coating elongate bodies such as pipes, rods, strips, wires and the like.

The method of the present invention is based upon the use of the fluidized bed coating process and has for a particular object a new and novel means of employing such process for the coating of elongate and/or endless bodies such as pipes, rods, strips, wires and the like.

In the employment of the fluidized bed coating process, for the coating of various types of articles, it has been the practice to maintain a pulverulent coating material, in the form of a fusible, film-forming resin, in an open top receptacle. The article to be coated, after being raised to above the fusion temperature of such resin, is downwardly immersed in the fluidized bed of material to contact the surfaces of the article with the resinous coating material. The heat of the article, at least in part, causes the resin to fuse into a continuous protective film on the contacted surfaces of such article.

While the above technique, that is, vertically immersing an article in an open topped fluidized bed container, is quite satisfactory for most articles, problems are presented when it is desired to coat certain elongate shapes due to the difficulty of introducing and removing from the container. While it is possible to coat conventional sections of pipe—say, about 20 to 40 feet in length—in this manner, the necessary dimensions of the fluidized bed container become so impractical, and the necessary handling techniques so difficult as to destroy commercial utility to this process. Further, if the elongate article is immersed in the fluidized bed with its axis vertically disposed, an unsatisfactory coating will result due to the difference in the depth of immersion between the bottom and the top of the pipe which results in substantial variance in the thickness of the coating over the length of the elongate body. In addition, it is exceedingly difficult, if not sometimes impossible, to use conventional fluidized bed techniques when coating substantially endless elongate bodies. This is encountered, of example, in the extrusion of wire and rod as well as in certain continuous welding processes for making pipe where it is advantageous to coat the articles immediately subsequent to their formation by such extrusion or welding. If these endless bodies are sufficiently flexible, they can sometimes be reeved under pulleys or the like which are located in the fluidized bed to cause immersion of the body in the fluidized bed of resins, but such handling techniques usually prove unsatisfactory due to the damage done to the coating material which is still in a soft and pliable condition.

Accordingly, it is an object of this invention to provide improved means whereby elongate articles can be coated in the fluidized bed process.

A further object of this invention is to provide means whereby substantially endless elongate articles may be continuously coated in the fluidized bed coating process.

A still further object of this invention is to provide means whereby elongate shapes may be handled in a horizontal plane while being passed through a fluidized bed of coating materials.

Yet another object of this invention is to provide means whereby elongate shapes may be passed through the side walls of fluidized bed containers without substantial loss of powders at the points of entry and exit through said side walls.

Yet a further object of this invention is to provide means whereby orifices can be positioned in the side walls of fluidized bed coating devices below the level of the fluidized bed without substantial loss of coating materials through such orifices.

A still further object of the invention is to provide a new and novel structure and method of coating elongate articles such as pipes, rods, etc., by moving the same longitudinally through the fluidized bed after being suitably heated and also for maintaining the article in rotary motion on its longitudinal axis while moving it longitudinally so that the surface will be effectively coated.

Yet a still further object of the invention is to provide a novel means for progressively heating the elongate article as it moves longitudinally through the bed, such heating means in one embodiment thereof being located immediately adjacent to the outside of the window or opening through which the article passes into the fluidized bed and in another embodiment being maintained within the receptacle containing the fluidized bed and immersed in the bed.

Briefly, the principal objects of this invention are accomplished by positioning orifices adapted to receive elongate articles and enable their passage through the fluidized bed below the upper level of the fluidized bed of pulverulent coating material. Loss of coating material from these orifices is minimized by causing a significant quantity of gas to flow inwardly through the orifices to impede the flow of coating materials outwardly therethrough. This inwardly flow of gases through the submerged orifice is established by maintaining less than atmospheric pressures within the fluidized bed container and/or by directing a positive flow of gases into the interior of the container at a point adjacent the submerged orifices.

In carrying out the method of the present invention, the coating material, in the form of pulverulent granules, is maintained in a suitable housing or receptacle and is transformed into a continuously moving or fluidized bed by effecting the movement of an ascending current, or currents, of a gas therethrough, the degree to which the bed is fluidized being controlled by controlling or varying the velocity of the gas forced therethrough. Means is provided for suitably supporting the elongate article for movement longitudinally through the fluidized bed coating material. Additionally, it may be convenient to provide means integral with the fluidized bed coating apparatus for raising the temperature of the article to the desired degree to effect the coalescence of the coating material particles thereon immediately before or after immersion in the fluidized bed. The rate of movement of the article through the bed and the temperature to which it is heated will determine, in part, the thickness of the coating produced thereon. Also, in addition to moving the elongate article longitudinally through the bed, means is advantageously provided for imparting rotary or axial turning movement thereto.

The heating of the article either immediately prior to its entrance into the bed or while it is in the bed should be to a temperature above the sintering or melting point of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article. If the article is heated only to the sintering point of the coating material prior to its immersion in the bed of coating material, it may be subjected to a post-heating operation to cause the coating material to flow out and form a smooth coating.

If required, the coating may be reinforced or thickened by repeating the procedure of passing the article longitudinally through the bed and, of course, preheating it progressively as it passes into and through the bed or heating it after it has entered the bed.

Preferred forms of apparatus by means of which the method may be carried out are disclosed in the accompanying drawings wherein:

FIG. 1 shows a vertical section through a fluidized tank constructed in accordance with the present invention whereby the maintenance of the fluidized condition of the coating material is effected by a maximum reduced or negative pressure above the bed with means for introducing the pipe or other elongate article into the bed through open or unrestricted windows, the figure also illustrating roller means for moving the article and for effecting its axial rotation;

FIG. 2 is a detail view in top plan showing the angular relation of one of the rollers to an article such as a pipe;

FIG. 3 is a vertical sectional view through a fluidized tank which provides means for maintaining a partial vacuum or reduced pressure above the bed together with valve controlled means for introducing a gas under pressure beneath the bed to rise therethrough and also showing novel means at the entrance and exit windows for preventing the powder material from escaping through the windows and also showing means for heating the article before it enters the bed;

FIG. 6 is a sectional view taken substantially on the line 6—6 of FIG. 3;

FIG. 7 is an elevational view of the structure shown in FIG. 3 rotated 90° to show means for feeding pulverulent material into the tank;

FIG. 8 is a vertical section through a structure similar to that shown in FIG. 3 but showing another means of heating the article and which structure may be employed for introducing a full gas pressure into the bed of coating material from the bottom thereof;

FIG. 9 is a sectional view taken substantially on the line 9—9 of FIG. 8 and on a slightly enlarged scale;

FIG. 10 is a sectional view taken substantially on the line 10—10 of FIG. 8;

FIG. 11 is a sectional view taken substantially on the line 11—11 of FIG. 3 on a slightly enlarged scale illustrating one form of supporting means for the coated body as it leaves the fluidizing tank;

FIG. 12 is a sectional view, on an enlarged scale, taken substantially on line 12—12 of FIG. 3; and FIG. 13 is a sectional view, on an enlarged scale, taken substantially on line 13—13 of FIG. 8.

Figure 3:
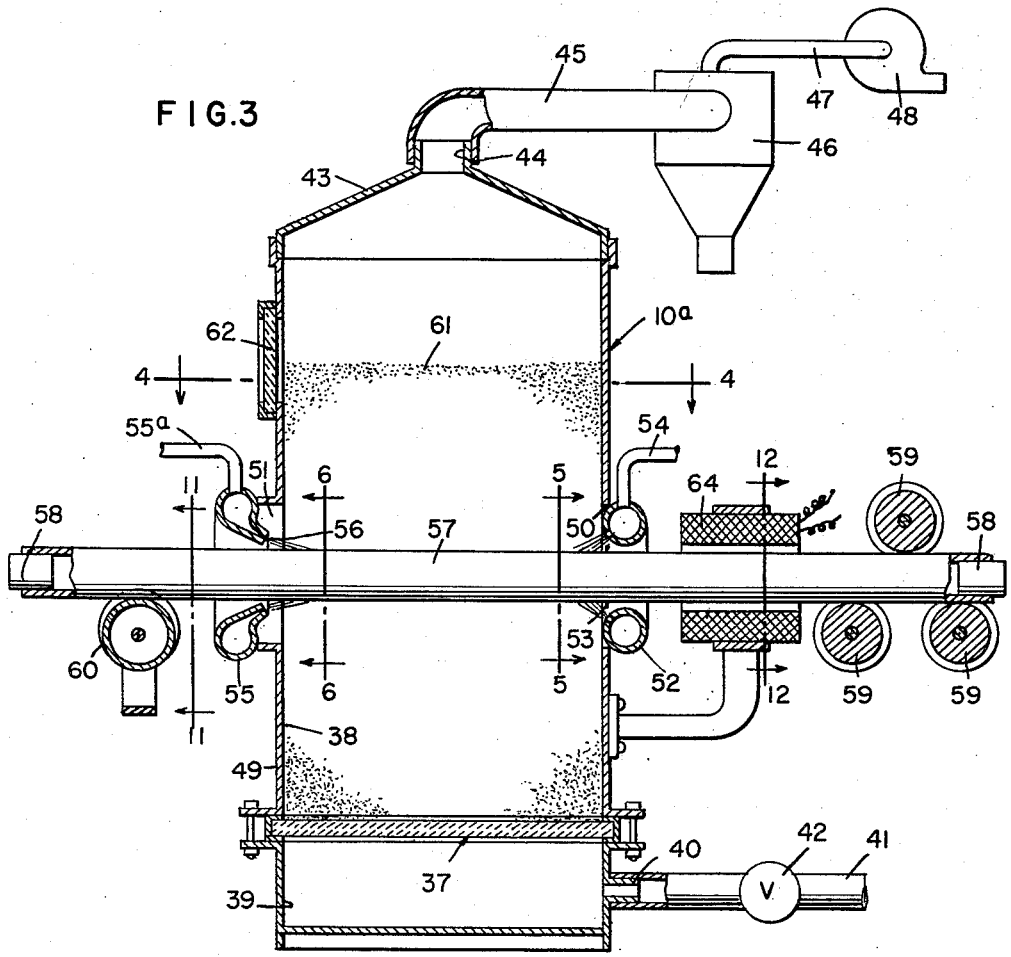
Figure 4:
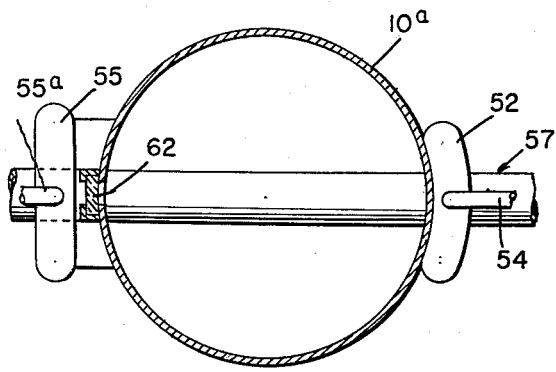
FIG. 4 is a horizontal section taken substantially on the line 4—4 of FIG. 3.
Figure 5:
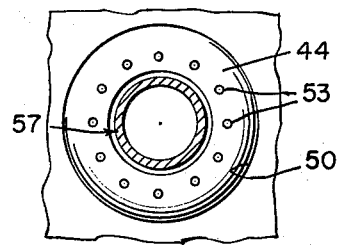
FIG. 5 is a sectional view taken substantially on the line 5—5 of FIG. 3.

Referring now more particularly to the drawings, FIG. 1 illustrates apparatus by means of which the bed of pulverulent material may be effectively maintained in a fluidized state entirely by the establishment of a reduced pressure or negative air pressure above the bed. In this first and relatively simple form of the apparatus, the numeral 10 generally designates a tank or housing of desired proportions, the same being here illustrated as being of substantial height and it may be of cylindrical form or of any other suitable cross sectional contour.

The bottom portion of the housing or tank is horizontally divided by a foraminous plate 12 which divides the structure into the upper coating material chamber 14 and a lower chamber 16 which forms an air receiving chamber or box and which is open to the atmosphere by way of the conduit 18. This conduit is here shown as having therein a control valve 20 which, in the operation of the structure here illustrated, under a reduced pressure or vacuum in the upper part of the housing, is maintained open so as to permit a full flow of air or other gas to enter the chamber to pass upwardly through the foraminous partition plate 12. This partitioning plate 12 may be of a suitable nature to permit the ready flow of gas upwardly therethrough without allowing any of the coating material particles to pass downwardly when the apparatus is not in operation.

The manner of securing the plate 12 in the position shown is not material but the arrangement here shown comprises spaced upper and lower flanges 21 and 22 and formed integral with the wall of the structure and which flanges may be drawn together by suitable bolts or clamps as indicated at 23.

The top part of the tank or housing is shown as having a closure 24 leading to and opening through a neck 24a to which may be coupled to conduit 25 leading to and through a suitable trap or separator in the form of a conventional cyclone unit 26 with which is connected a suitable pump 27 or other means for effecting a reduction of air pressure in the upper portion of the chamber 14. While not so illustrated in the drawings, it is often desirable to increase the cross-sectional area of the tank or housing to form an inverted-frusto-conical portion above the bed level b. By such means the velocity of the fluidizing gases leaving the bed are reduced to enable some of the gas entrained particles to settle back into the bed and so diminish the amount of fine particles carried over to the cyclone 26. A downwardly directed conduit (not shown) may also be affixed to the lower (solids) discharge of cyclone 26 to communicate with the interior of tank 10 and reintroduce collected fine solids back into the fluidized bed.

In accordance with the present invention, the wall 28 of the tank or housing is provided at suitable elevation above the partition plate 12 with the oppositely positioned or located window openings 29 and 30 through which a pipe, rod or other long body may pass into and through the fluidized bed of coating material. These openings are unobstructed and may be of suitable size to take a number of pipes or rods of varying diameters.

As hereinbefore stated, the articles to be coated must be heated to a suitable temperature before entering the bed or as soon thereafter as possible so as to effect coalescence of the particles of coating material thereon and one suitable means for effecting this heating is here illustrated as being in the form of an electrical induction coil 31 supported upon the outside of the wall 28 in alignment with the entrance opening 29. Alternatively, if desired, the articles to be coated may be heated in any suitable oven means, not shown herein, prior to transferring the articles to the fluidized bed.

At opposite sides of the tank or housing, means is provided for supporting a pipe, as indicated at 32, a rod or other long body and moving the same axially through the tank, through the openings 29 and 30, and the means here illustrated is in the form of concave rollers 33 supported for rotation on axes oblique to the axis of the pipe 32, which rollers when turned by suitable driving means, not shown, will effect the forward or longitudinal movement of the pipe through the tank and also impart a rotary motion thereto.

Since the coating applied to the pipe or other article is or may be incompletely set or congealed as the pipe passes through the outlet window 30 onto the adjacent roller 33, contact with the roller when the coating is in this condition would be likely to damage the coating. Accordingly, a means is provided for reducing the temperature of the coating so as to effectively set or harden the same and such means is here shown more or less diagrammatically as being in the form of a hollow ring or annulus 34 aligned with the exit opening so that the pipe will pass therethrough and this hollow ring is provided on its inside with a multiplicity of apertures through which water or other cooling fluid may be projected onto the pipe which the ring surrounds and the numeral 35 designates a suitable pipeline connected with the ring for conducting the cooling fluid thereto. Flexible sealing means may also be associated with opening 29 to surround the pipe and prevent the escape of powder from the opening 29. These sealing means should be able to withstand the preheat temperature of the pipe without deterioration and materials such as silicone rubbers and polytetrafluoroethylene are suitable. Note that sealing means cannot be employed at opening 30 as it would wipe or otherwise mutilate the hot, soft coating layer.

In the operation of the apparatus in this first illustrated embodiment, the bed of pulverulent coating material when at rest, would have the top thereof somewhat below the openings 29 and 30, the reference character $a$ designating the level of such bed when at rest.

Upon the creation of a suitable reduced pressure in the upper portion 14a of the chamber 14, air or other suitable gas will be drawn into the chamber 16 and will flow upwardly through the partitioning plate 12 and elevate the bed in a fluidized state to a substantial elevation above the openings 29 and 30, as illustrated, where the top part of the fluidized bed is designated $b$.

In order to observe the state of fluidization, the wall 28 of the tank may be provided with the observation window 36.

Due to the maintenance of pressures less than atmospheric within the tank, it will be seen that the coating material will rise past the window openings 29 and 30 without substantial loss through the openings since air will flow into the tank through the window openings and thus oppose the escape of material therethrough. With this arrangement, by providing the relatively large window openings, pipes, rods or other long devices of different sizes may horizontally be run through the tank and coated, being progressively heated as they enter the fluidized bed by the induction heater 31 or any other suitable type of heating means.

In place of using a full vacuum or high vacuum or reduced air pressure for pulling air through the bed of coating material to fluidize the same as above described and as illustrated in FIG. 1, a combination of overhead reduced pressure and positive pressure from beneath the bed may be effectively employed for carrying out the coating process in this manner, as illustrated in FIGS. 3 to 13. Also, as is illustrated in FIGS. 3 and 8, heating means may be provided and located either exteriorly of the tank or housing, or interiorly thereof.

Referring now particularly to FIGS. 3 to 7, the coating material tank or housing is illustrated as being of the same general form or design as that shown in FIG. 1, such tank or housing here being generally designated 10a.

The lower part of the tank is shown as divided by the foraminous partition structure 37 thereby dividing the tank into the upper chamber 38 and the lower chamber 39. The wall of the lower chamber 39 has a gas admission opening therein defined by the illustrated nipple 40 to which may be connected a gas supply conduit 41 carrying a control valve 42.

The upper or top end of the tank structure may be open and fitted with a closure head 43 which leads to the upwardly extending outlet neck 44 with which is connected, as in the previous structure, a conduit designated 45 leading to the separator 46 from which leads conduit 47 which is connected with a suitable pump or other means 48 for reducing the air pressure within the top of the tank.

It will also be apparent that the trap or separator structure 46 here shown, as well as that shown in FIG. 1 at 26, will pick up any entrained particles of the coating material so as to prevent the same passing into the pressure reducing pump and being lost, the particles being recoverable from the separator as will be understood.

The wall 49 of the upper chamber is provided at a suitable elevation above the air diffusing partitioning wall 37 with the diametrically opposite exit and entrance openings 50 and 51. Positioned in concentric relation with the entrance opening 50 is an annular hollow air collar 52. This collar is here shown as being on the outside of the wall 49 but it might also be upon the inner side thereof if desirable or found feasible.

This air collar 52 has the wall thereof on the inner side or adjacent to the center of the collar provided with a multiplicity of fine or small air outlet or jet openings 53 or the same may be in the form of nozzles if desired, and such openings are in a circular arrangement and are disposed to direct air under pressure from within the annular collar inwardly in converging streams which would meet at the axial center line of the entrance opening or of the collar which is concentric with the opening.

Air or other gas under pressure may be introduced into the collar 52 by means of the pipe 54. If a sealing means is provided at entrance opening 50 as described with regard to the apparatus of FIG. 8, air collar means 52 are made unnecessary.

At the exit opening 51, means is also provided for directing an air blast inwardly along convergent paths in a manner similar to the action described in connection with the collar 52. This means at the exit opening also is in the form of a hollow annulus or collar which is supported exteriorly of the tank in concentric relation with the opening 51 and is generally designated 55. The structure 55 is shown as being of slightly different form from the collar 52 although its function is the same. The structure or collar 55 is shown as having the wall thereof formed with the inwardly directed annular nozzle 56, which nozzle has a small or narrow exit opening directed toward the axial center of the collar so as to project a cone of air into the tank.

The oppositely positioned and axially aligned collars 52 and 55 are of a size to permit the passage therethrough of a pipe such as that illustrated and generally designated 57. Preferably the collars are sized to relatively closely encircle the pipe passing therethrough although the structure will function as desired for the coating of pipes of smaller size since the inwardly projecting air jets from the collars and the slightly reduced pressures within the tank 10a will effectively prevent any of the powder material from escaping through either of the windows which the collars encircle.

In the operation of coating a tubular body as here shown and as shown in FIG. 8, the ends of the tubular body are closed in a suitable manner to prevent the coating material from entering the same and such closures are here shown as being in the form of plugs 58 although any other suitable means may be provided for this purpose.

For supporting the pipe or elongate body and also moving it longitudinally through the fluidized bed, there may be provided a system of rollers of suitable character which may be mounted to rotate on parallel axes and axes perpendicular to the line of travel of the pipe or they may be mounted to turn on obliquely extending axes whereby to impart axial rotation to the pipe simultaneously with the movement of the same through the bed. In the illustration of the structure in FIG. 3, the rollers for advancing the elongate body to and through the windows and the air collars are designated 59 and are peripherally channeled or grooved so as to properly support the body being coated. At the exit opening and outwardly from the air collar 55, there is shown a grooved roller 60 onto which the coated pipe passes and by which it is supported.

Since the pipe or other elongate body upon leaving the fluidizing bed will have a coating thereon which may not be fully hardened by the time it reaches the supporting roller 60, such roller is preferably designed to provide a soft supporting surface or cushion and as an example of one form of roller or wheel which might be suitable, there is shown an air filled or balloon tire of suitable soft material which will be depressed by the pipe or other body to form a suitable supporting channel as illustrated in FIG. 11. By this means the newly applied coating will be protected against abrasion or damage. Alternatively, a spray of cooling liquid may be directed against the pipe, as illustrated in FIG. 1, after the pipe leaves the bed but prior to the time it contacts supporting roller 60.

In addition to its function of preventing the escape of the coating powder from the tank through the exit opening 51, the collar may be employed as a means of cooling the newly applied coating by having introduced thereinto by way of the pipe 55a chilled air or other suitable gas and this will additionally assure the protection of the new coating against damage as it rides on the balloon wheel or roller 60.

No specific means has been illustrated for supporting the various rollers and also for turning or driving the same, as it is believed to be obvious that any desired means may be employed for this purpose.

In the operation of the structure disclosed in FIG. 3, the pressure and vacuum are adjusted whereby the pressure of the fluidized bed at openings 50 and 51 is reduced and coacts with air jets 53 and 56 to prevent the loss of substantial quantities of coating material through openings 50 and 51.

In the structure shown in FIG. 3, the means for raising the temperature of the elongate body to the desired degree is illustrated as an induction coil 64 as in the previously described structure which is supported in a suitable manner, as shown, in axial alignment with the opening 50 and a collar 52 on the outer side of the latter.

As hereinbefore stated, the coating process for pipes and other elongate bodies may be accomplished by the use of a positive pressure only for fluidizing the bed of pulverulent material.

In FIG. 8 there is illustrated a construction similar to that shown in FIG. 3 and wherein the heating means for the pipe is shown as being located within the tank in the bed of fluidized material. In this FIG. 8, the tank or housing is generally designated 10b with the lower portion divided or partitioned by the gas pervious diffusing wall 65, thereby providing the positive pressure gas chamber 66 and the upper or overlying coating material chamber 67.

Numerals 68 and 69 designated respectively the diametrically opposite entrance and exit openings by which the pipe or other elongate body 70 may be passed longitudinally through the bed of fluidized material, which material is generally designated 71 and is shown in the fluidized condition and which condition may be observed through the window 72 in the wall of the tank as in previous structures. The numeral 73 generally designates an air jet or air core forming means of the same construction as that previously described and designated 55.

At the entrance opening 68 a slightly different form of seal is provided for preventing the escape of material through the entrance window or opening. This seal is here shown as comprising an elastic diaphragm 74 which is secured to the tank wall around its periphery by suitable means such as the plate or ring 75 and which has a central opening 76 through which the elongate body is forced to pass. Thus, as the body is forced into the opening 76 which initially would be of very much less diameter than the pipe or other body, the opening will be stretched and the edge thereof will maintain the desired seal about the body.

In this structure of FIG. 8, the heating means in the form of an induction coil 77 is shown supported within the tank or housing in axial alignment with the aligned entrance and exit openings. By this means the pipe or other body will be heated after it enters the tank and will be progressively heated as it passes through the bed. Here, as described in connection with the preceding structures, the supporting means for the elongate body and the means for moving it axially through the tank may be such as to also impart axial turning simultaneously with the longitudinal movement.

In this FIG. 8, no means is illustrated for drawing off the fluidizing gas from the upper part of the tank as it will be readily understood that a separator and air pump may be connected with the tank as in the preceding structure or the top part of the tank may be left open as may be found desirable.

A third method of carrying out the present invention involves, as hereinbefore stated, the employment of a positive gas pressure introduced below the bed of pulverulent material and the valved pipe 79 is therefore connected with the inlet opening 80 leading into the chamber 66 for introducing the desired gas under pressure from a suitable source. The degree of fluidizing of the bed may be controlled by means of the valve in the pipe 79 as will be apparent and, of course, that the top part of the tank will be in communication with atmospheric pressures so that the material will rise freely around the pipe or other elongate body as it is moved transversely through the bed.

It will, of course, be apparent that as the elongate bodies are passed through the tanks to be coated, the quantity of coating material will be gradually reduced and, accordingly, it is desirable to provide a means for replenishing the supply of material and one such means is illustrated in FIG. 7 where the wall of the tank has connected therewith and opens therethrough into the material chamber above the partitioning plate, a pipe or conduit 81 disposed at a downward inclination and terminating at its upper end in the vertical portion 82 and this pipe forms a discharge leg for a material supply hopper 83 which is shown as provided with a downwardly extending nozzle 84 which is slidably positioned within the top portion 82 of the feed pipe or leg 81.

By providing a suitable means, not shown, connected with the hopper 83, the latter may be raised or lowered as may be required to effect the desired replenishment from the hopper of the coating material within the tank. The rate of flow of material from hopper 83 into the fluidized bed may also be controlled by fluidizing the material within conduits 81 and 82 in any suitable manner well known in the prior art.

The tank here shown in connection with the supply hopper 83 may represent any one of the tanks hereinbefore referred to but carries the same designating character 10a as that shown in FIG. 3 and may be taken as representing that tank and, accordingly, certain other reference characters are here applied as are used upon the previously described tank structure.

In the working of the present invention, by the employment of any one of the different forms of apparatus shown, any gas which is reasonably inert at the temperatures and with the materials employed, may be used as the fluid medium for elevating or fluidizing the coating material. Air is usually satisfactory and is preferred for reasons of economy. However, in order to avoid oxidation, it is sometimes preferable to use nitrogen or some other non-oxidizing gas. Since elongate bodies of varying sizes may be coated by the present method, the pressure of the selected gas either drawn into and through the bed by reducing the pressure over the bed, or forced through the bed by being introduced under pressure into the underlying chamber, may vary greatly depending upon the particular shape and dimensions of the tank as well as on the particular type of coating material used. In the case of the employment of reduced pressure above the bed, the control valve 20 may be set fully opened or it may be partially opened as may be desired to control the flow or if it is set fully open, then the force with which the indrawn gas is moved through the bed may be conveniently controlled by varying the operation of the vacuum pump. In any case, the velocity with which the gas passes through the bed should not be such as to create an appreciable dust cloud of the coating material in the top of the tank.

In the use of the heating coil or other heating means, the temperature of the body is controlled in the area thereof which is to be contacted by the pulverulent material so that it will be above the sintering temperature of the material but below the decomposition point thereof. Thus, when the body is suitably heated and moved through the fluidized bed, both longitudinally and rotationally, the fluidized powder will enter or flow into all crevices, channels, grooves and the like which may be present in the wall of the article so that every part of the article comes into contact with the material. The rotational motion given to the body is also advantageous to prevent excess accumulation of static pulverulent material on the upper portion thereof.

When the pipe or other elongate article is passed through the fluidized bed in the manner stated, it will initially appear to be coated with a powder. After a short interval of time, however, this powder melts or coalesces into a continuous coating due to the transfer of heat from the heated article. It will be understood that by passing the article through at a slow rate, the heated portion which is immersed in the bed will cool somewhat and the coating may solidify. If this is done, the coating will be relatively heavy and will possess a rough, powdery outer surface of the powdered coating material which has not fully coalesced and is not entirely coherent to the remainder of the coating. It will be found, however, that the intermediate portions of the coating between the outermost surface and the innermost portions will possess progressively greater degrees of coalescence and that the innermost portions will be completely coalesced into a continuous covering for the article. If such a powdery outer surface does result, it is generally desirable to reheat the coated article after it leaves the fluidized bed, and, by such post heating treatment, cause the powdery surface layer to fuse and coalesce into a continuous and smooth covering.

As will be readily apparent from the preceding description, the preheating temperature of the article where it passes through the coil 64 or the temperature is imparted to the article within the powder chamber by the coil 77, must be related to the sintering temperature of the coating material and must equal or exceed that temperature. For instance, for polyethylene having a melting temperature of approximately 240° F., it has been found that metal articles can be satisfactorily heated in the chamber or preheated to from 300° F. to about 570° F. or preferably in a range of from 430° F. to 480° F. for the production of satisfactory coatings. It may be stated that the maximum possible range of heating temperatures for the practice of the method of this invention would be as follows: The low limit would correspond to the melting or softening point of the material which is to form the coating and the upper limit of the temperature range would correspond to the temperature at which the article to be coated would deform or melt, or at which the article or the coating material would decompose. In selecting the appropriate preheating temperature, consideration must be given to the heat retentivity and mass of the article as well as the time delay in introducing the article into the bed. For example, a thin walled aluminum tube preheated in an oven would need be heated to a higher degree than a thick walled iron pipe to allow for the heat loss in transferring the aluminum tube from the oven to the fluidized bed.

In the preceding material, reference has only generally been made to fusible, film-forming resins as the coating materials with the one exception of the mentioning of polyethylene. In this connection, attention is directed to the patent to Gemmer, 2,844,489, as disclosing a number of examples of suitable thermoplastic and thermosetting resins and other materials contemplated to be used in carrying out the present invention and it is therefore to be understood where reference is made to fusible, film-forming materials, any one of the materials shown in this patent may be employed or other fusible materials of a nature suitable for accomplishing the desired coating.

From the foregoing it will be seen that there is provided by the present invention a new and novel method and apparatus for carrying out the same for efficiently applying to elongate bodies such as pipes, rods, strips, wires or the like, various types of coatings using the materials set forth. Also it will be seen that a particular advantage of this method lies in the fact that long bodies can be coated by the fluidized bed process, by means of relatively small size equipment, since it is not necessary to have a fluidized bed of a size which would admit of the immersion of the elongate body all at one time into the bed.

I claim:

1. Apparatus for coating elongate bodies, comprising a substantially closed chamber for containing a bed of pulverulent coating materials, a gas permeable plate in the lower portion of said chamber for admitting gas thereinto to flow upwardly through and fluidize a bed of coating materials in the chamber, an upper closure member for said chamber, said chamber having opposite sides provided with orifices in substantially horizontal alignment to enable substantially horizontal and axial passage of an elongate body into and out of the chamber through a bed of fluidized coating materials in the chamber, means adjacent to each of said orifices for supporting an elongate body for axial passage therethrough, and gas impeller means connected with said upper closure member for withdrawing from the chamber gas flowing upwardly through said permeable plate into and through a bed of coating materials and gas entering the chamber through an orifice around an elongate body passing therethrough.

2. Apparatus according to claim 1, including means for applying gas under pressure to the lower side of said permeable plate for passage therethrough into said chamber.

3. Apparatus according to claim 1, wherein the said means for supporting an elongate body for axial passage through the chamber is constructed to rotate the elongate body on its longitudinal axis.

4. Apparatus according to claim 1, with means adjacent to at least one of said orifices for directing a gas under pressure into said chamber around an elongate body passing through the chamber.

5. Apparatus according to claim 1, with heating means adjacent to an orifice for heating an elongate body as it enters the chamber.

6. Apparatus according to claim 5, wherein said heating means is an induction heating means located within the chamber.

7. Apparatus according to claim 1, wherein said chamber is constituted by a vertical hollow body of circular cross section.

8. Apparatus according to claim 5, with means for applying a temperature reducing fluid to a coated elongate body as the body passes through an orifice and out of the chamber.

9. Apparatus according to claim 1, with means adjacent to one orifice for directing a gas under pressure, through the orifice, into said chamber around an elongate body passing through the chamber, an elastic centrally apertured diaphragm overlying the other orifice for engagement with and around an elongate body passing into the chamber and an induction heating means within the chamber adjacent to said diaphragm for heating the elongate body as it enters the chamber.

References Cited in the file of this patent

UNITED STATES PATENTS

| 1,263,858 | Cole | Apr. 23, 1918 |
| 2,363,741 | Montgomery | Nov. 28, 1944 |
| 2,414,625 | Abrams et al. | Jan. 21, 1947 |

(Other references on following page)

UNITED STATES PATENTS

| | | |
|---|---|---|
| 2,666,269 | Parry | Jan. 19, 1954 |
| 2,758,564 | Randall | Aug. 14, 1956 |
| 2,841,516 | Morton | July 1, 1958 |
| 2,880,109 | Current et al. | Mar. 31, 1959 |
| 2,919,160 | Blackburn | Dec. 29, 1959 |
| 3,019,126 | Bartholomew | Jan. 30, 1962 |

FOREIGN PATENTS

| | | |
|---|---|---|
| 700,177 | Great Britain | Nov. 25, 1953 |
| 1,005,413 | Germany | Mar. 28, 1957 |

OTHER REFERENCES

Checkel, R. L.: "Modern Plastics," October 1958, pages 125, 126, 128, 130, and 132.